United States Patent
Okabe et al.

(10) Patent No.: US 8,772,688 B2
(45) Date of Patent: Jul. 8, 2014

(54) AUTOFOCUS DEVICE INCLUDING LINE IMAGE FORMING UNIT AND ROTATION UNIT THAT ROTATES LINE IMAGE

(75) Inventors: Kenji Okabe, Kawasaki (JP); Seiji Shimokawa, Kawasaki (JP); Kazuki Kitagawa, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 204 days.

(21) Appl. No.: 13/345,315

(22) Filed: Jan. 6, 2012

(65) Prior Publication Data

US 2012/0193511 A1 Aug. 2, 2012

(30) Foreign Application Priority Data

Jan. 31, 2011 (JP) ................ 2011-017415

(51) Int. Cl.
*G02B 7/04* (2006.01)
*G02B 27/40* (2006.01)
*G02B 21/24* (2006.01)

(52) U.S. Cl.
CPC .................. *G02B 21/245* (2013.01)
USPC ............. 250/201.4; 250/201.2; 250/201.1

(58) Field of Classification Search
USPC ............. 250/201.2, 201.3, 201.5, 235, 559.4, 250/208.1; 356/399–402; 235/462.01–462.49
See application file for complete search history.

(56) References Cited

U.S. PATENT DOCUMENTS

| | | | | |
|---|---|---|---|---|
| 3,774,014 A | * | 11/1973 | Berler ...................... | 235/462.11 |
| 6,034,766 A | * | 3/2000 | Sugiura et al. ............. | 356/239.1 |
| 6,909,799 B1 | | 6/2005 | Wildmann et al. | |
| 7,209,287 B2 | * | 4/2007 | Lauer ............................ | 359/368 |
| 2001/0042816 A1 | | 11/2001 | Fujimoto et al. | |
| 2002/0162891 A1 | * | 11/2002 | Mulla et al. .............. | 235/462.49 |
| 2004/0032650 A1 | | 2/2004 | Lauer | |
| 2006/0231730 A1 | | 10/2006 | Miyamoto | |
| 2006/0287121 A1 | * | 12/2006 | Cameron et al. .............. | 473/220 |
| 2008/0156878 A1 | * | 7/2008 | Reinier et al. ........... | 235/462.32 |
| 2009/0021801 A1 | * | 1/2009 | Ishihara ........................ | 358/475 |
| 2010/0053735 A1 | * | 3/2010 | Wilson et al. ................ | 359/363 |

FOREIGN PATENT DOCUMENTS

| | | |
|---|---|---|
| CN | 1175687 A | 3/1998 |
| DE | 19853302 | 5/2000 |
| JP | 2001-124530 | 5/2001 |
| JP | 2006-153622 | 6/2006 |
| JP | 2006-276320 | 10/2006 |

OTHER PUBLICATIONS

Extended European Search Report dated Jun. 12, 2012; Applicant: Mitutoyo Corporation; Application No. 12151366.7; seven pages.

* cited by examiner

*Primary Examiner* — Georgia Y Epps
*Assistant Examiner* — Carolynn A Moore
(74) *Attorney, Agent, or Firm* — Rankin, Hill & Clark LLP

(57) ABSTRACT

An autofocus device including: an optical source; an optical unit that allows emitted light from the optical source and object light from a measurement target to pass through the same optical path, the optical unit being arranged between the optical source and the measurement target; and a detection unit that performs focus detection by using the object light passed through the optical unit. The optical unit includes: a tube lens that forms the emitted light into parallel light; an image forming unit that forms a continuous line image on a surface of the measurement target; and a rotation unit that rotates the continuous line.

10 Claims, 11 Drawing Sheets

MEASUREMENT IS POSSIBLE    MEASUREMENT IS DIFFICULT    MEASUREMENT IS POSSIBLE

AUTOFOCUS DEVICE INCLUDING LINE IMAGE FORMING UNIT AND ROTATION UNIT THAT ROTATES LINE IMAGE

CROSS-REFERENCE TO RELATED APPLICATION

The present U.S. patent application claims a priority under the Paris Convention of Japanese patent application No. 2011-017415 filed on Jan. 31, 2011, which shall be a basis of correction of an incorrect translation, and is incorporated by reference herein.

BACKGROUND OF THE INVENTION

1. Field of the Invention

The present invention relates to an autofocus device.

2. Description of the Related Art

Heretofore, an autofocus device, which is provided in an image measurement machine or an optical instrument, has been known.

The autofocus device condenses a single light beam onto a measurement target (work), performs focus detection, and adjusts a focusing position.

Specifically, for example, in an autofocus device 500 shown in FIG. 8, a laser beam light emitted from a laser diode 501 (emitted light) is irradiated onto a work W through a half mirror 502, a tube lens 511 and an objective lens 513. Object light, which is the emitted light reflected on a surface of the work W and returned through the objective lens 513 and the tube lens 511, is split into two by a beam splitter 504, and two pieces of light are made incident onto photo acceptance units 505A and 505B. At this time, on the surface of the work W, an image of a micro spot S is formed.

In the autofocus device as described above, for example, as shown in FIG. 9A and FIG. 9B, if the surface of the work W has a level difference, when the focus detection is performed at the boundary of the level difference (edge line E), a single light beam irradiated onto the edge line E is scattered by the edge line E. Accordingly, there is a problem that the focus detection cannot be performed.

Therefore, for example, as shown in FIGS. 10A and 10B, there is proposed a technology for forming a line-like image L on the surface of the work W by using a cylindrical lens 512 (for example, refer to Japanese Patent Laid-Open Publication No. 2006-276320 as Patent Literature 1). In this case, even if a part of the beam is scattered on the edge line E, the other part of the beam reflected on the other part of the line-like image L can be detected, and focus detection by using the average distance to the surface of the work W can be performed (which is hereinafter referred to as "averaging effect").

However, in the invention described in Patent Literature 1 described above, for example, as shown in FIG. 10C and FIG. 10D, the entire beam is scattered depending on an orientation (direction of the level difference) of the work W in such a case where a direction of the edge line E of the level difference and a direction of the line-like image L coincide with each other. Therefore, in some cases, it is difficult to perform the focus detection.

SUMMARY OF THE INVENTION

It is an object of the present invention to provide an autofocus device capable of suitably measuring the surface of the measurement target even in the case where the level difference is present on the surface.

A first aspect of the present invention is an autofocus device comprising:

an optical source;

an optical unit that allows emitted light from the optical source and object light from a measurement target to pass through the same optical path, the optical unit being arranged between the optical source and the measurement target; and a detection unit that performs focus detection by using the object light passed through the optical unit, wherein the optical unit comprises:

a tube lens that forms the emitted light into parallel light;

a line-like image forming unit that forms a line-like image on a surface of the measurement target by the parallel light from the tube lens; and a rotation unit that rotates the line-like image.

BRIEF DESCRIPTION OF THE DRAWINGS

The present invention will be more fully understood by the following detailed description and the accompanying drawings; however, these are only for the purpose of description, and do not limit the scope of the present invention, wherein.

DETAILED DESCRIPTION OF THE INVENTION

A description is made below in detail of the autofocus device according to the present invention with reference to the drawings.

The autofocus device according to the present invention is mounted on an optical apparatus such as a microscope or an image measurement machine.

First Embodiment

A description is made of a configuration of an autofocus device 100 according to a first embodiment.

Figure 1A:
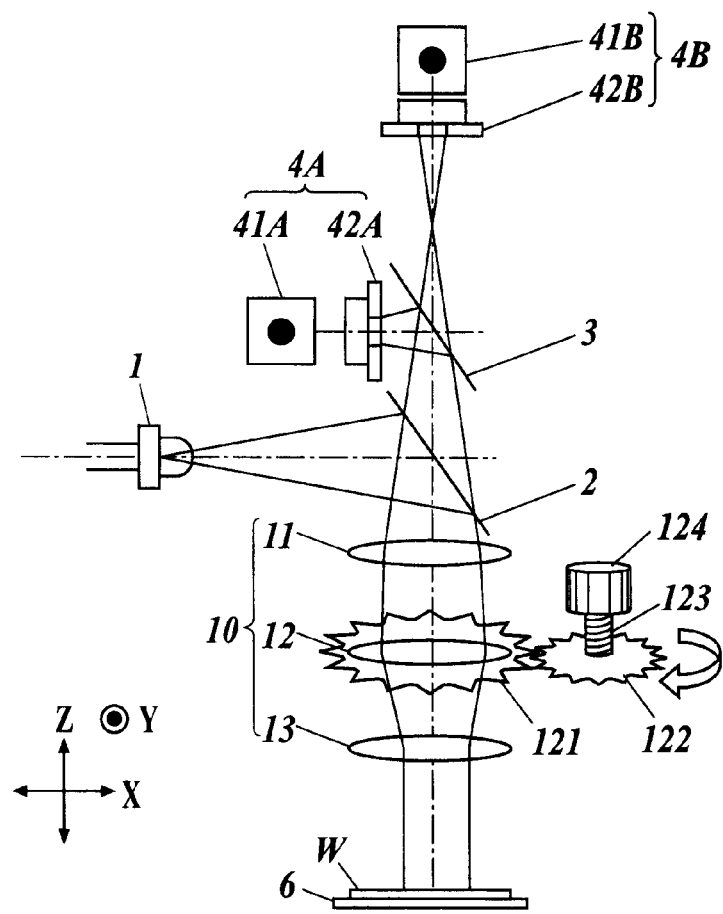
FIG. 1A is an elevation view showing an autofocus device according to a first embodiment.
Figure 1B:
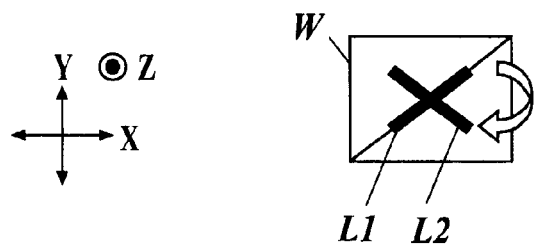
FIG. 1B is a plan view of a work W of FIG. 1A.
Figure 2:
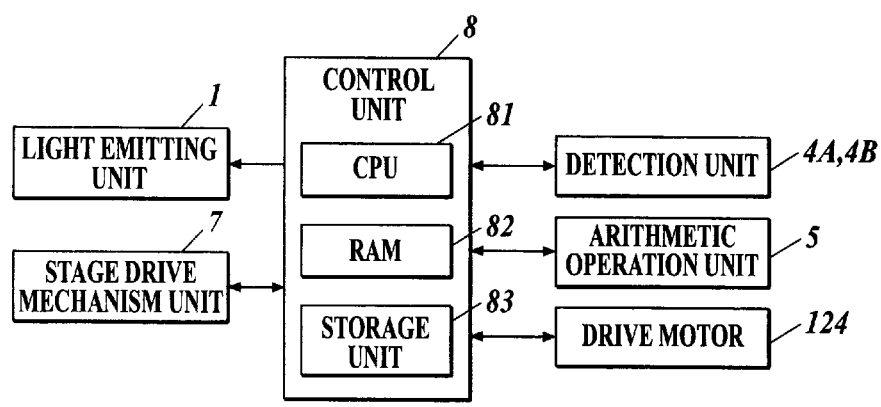
FIG. 2 is a block diagram showing an autofocus device 100 according to the first embodiment.

As shown in FIGS. 1A, 1B and FIG. 2, the autofocus device 100 according to the first embodiment includes: a light emitting unit 1; a half mirror 2; an optical unit 10; a beam splitter 3; detection units 4A and 4B; an arithmetic operation unit 5; a stage 6; a stage drive mechanism unit 7; a control unit 8; and the like.

In the first embodiment, as shown in FIGS. 1A and 1B, a direction from the light emitting unit 1 to the half mirror 2 is defined as an X-direction (right and left direction), a direction from the half mirror 2 to the optical unit 10 is defined as a Z-direction (vertical direction), and a direction perpendicular to the X-direction and the Z-direction is defined as a Y-direction (front and back direction).

The light emitting unit 1 includes an optical source such as a discharge lamp, a light emitting diode and LASER, and generates and emits a light beam. The light emitted from the light emitting unit 1 (emitted light) is irradiated onto the half mirror 2 arranged on a right side of the light emitting unit 1 in the X-direction.

The half mirror 2 reflects the incident light emitted from the light emitting unit 1, toward the optical unit 10 arranged on a lower side of the half mirror 2 in the Z-direction. The emitted light reflected by the half mirror 2 is irradiated onto the optical unit 10 from above.

Moreover, the half mirror 2 transmits therethrough object light, which is the emitted light reflected on a surface of a work W, travels from below through the optical unit 10. The object light transmitted through the half mirror 2 goes toward the beam splitter 3.

The optical unit 10 is arranged between the half mirror 2 and the work W, and allows the emitted light from the light emitting unit 1 and the object light from the work W to pass through the same optical path.

Specifically, the optical unit 10 includes a tube lens 11, a cylindrical lens 12 and an objective lens 13 in order from above. Note that optical axes of the tube lens 11, the cylindrical lens 12 and the objective lens 13 are the same.

The tube lens 11 forms the emitted light reflected by the half mirror 2 into parallel light, and irradiates the parallel light onto the cylindrical lens 12 located below.

As a light shape deforming unit, the cylindrical lens 12 deforms such circular parallel light, which comes from the tube lens 11, into a line shape. When the parallel light is irradiated from above into this cylindrical lens 12, the parallel light is converted into a line-like beam, and the line-like beam is irradiated onto the objective lens 13 located below. Note that the cylindrical lens 12 is provided detachably.

Moreover, onto an outer circumference of the cylindrical lens 12, a first gear 121 is attached. The first gear 121 rotates in conjunction with rotation of a second gear 122 arranged so that teeth thereof can mesh with teeth of the first gear 121. In such a way, the cylindrical lens 12 rotates. When the cylindrical lens 12 rotates with the first gear 121, a line-like image L1 condensed by the objective lens 13 rotates, for example, to a line-like image L2 as shown in FIG. 1B.

A center of the second gear 122 is coupled to one end of a rotation shaft 123, and the second gear 122 rotates by rotation of the rotation shaft 123, and rotates the first gear 121.

The other end of the rotation shaft 123 is coupled to a drive motor 124, and the rotation shaft 123 rotates at a constant speed by drive force transmitted thereto from the drive motor 124.

The drive motor 124 rotates the rotation shaft 123 in response to a control signal outputted by the control unit 8.

These first gear 121, second gear 122, rotation shaft 123 and drive motor 124 function as a rotation unit that rotates, by a predetermined angle, a line-like image L condensed by the objective lens 13.

The objective lens 13 is provided to face to the work W, and forms the line-like image L, which is made of the line-like beam irradiated thereonto from the cylindrical lens 12, on a surface of the work W. That is to say, the emitted light, which is reflected by the half mirror 2, transmits through the optical unit 10 (the tube lens 11, the cylindrical lens 12, the objective lens 13), and reaches the work W, forms the line-like image L on the surface of the work W.

The rotation unit (drive motor 124) is controlled to rotate the cylindrical lens 12, whereby it is possible to rotate the line-like image L formed on the surface of the work W.

Figure 3A:
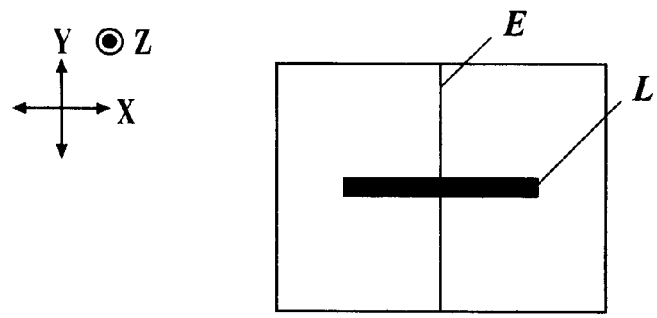
FIGS. 3A, 3B and 3C are plan views of the work W, showing relationships between a line-like image L and an edge line E of a level difference.
Figure 3B:
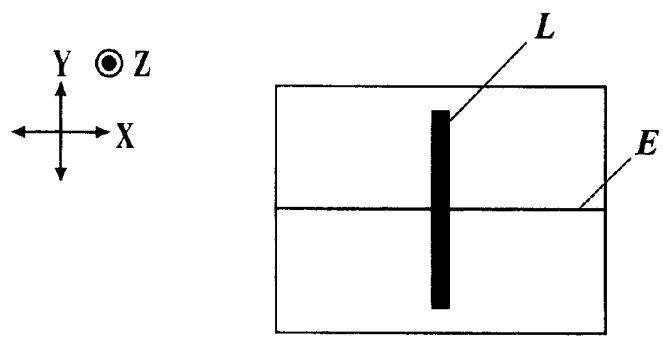
Figure 3C:
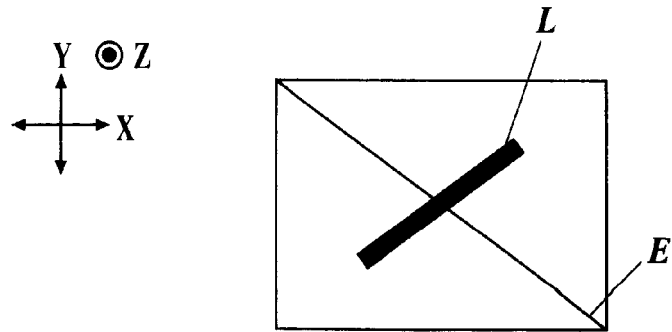

Hence, for example, as shown in FIG. 3A to FIG. 3C, the line-like image L rotates so as not to overlap a direction of an edge line E present on the surface of the work W, whereby focus detection can be performed whichever orientation the edge line E may be present in.

Then, at the time of transmitting through the optical unit 10 from below, the object light, which is reflected on the surface of the work W and travels through the same optical path as that of the emitted light in a reverse direction thereto, is converted again from the line-like beam into the circular parallel light by the cylindrical lens 12. Then, the object light passes through the half mirror 2 located above the cylindrical lens 12, and goes toward the beam splitter 3.

Here, since the cylindrical lens 12 is provided detachably, an image formed on the surface of the work W can be switched between the line-like image L and a conventional spot-like image by attaching and detaching of the cylindrical lens 12. For example, in the case where the cylindrical lens 12 is detached, the objective lens 13 forms the spot-like image on the surface of the work W by the parallel light irradiated thereonto from the tube lens 11.

Note that attaching/detaching operations for the cylindrical lens 12 may be manually performed. Alternatively, in the case where the focus detection cannot be performed on the line-like image L (for example, in such a case where a predetermined light quantity cannot be obtained since the line-like image L formed on the surface of the work W overlaps the edge line E completely and is not appropriately reflected), the cylindrical lens 12 may be automatically detached from the optical path, whereby the image may be switched to the spot-like image. On the contrary, in the case where the focus detection cannot be performed by means of the spot-like image (in such a case where the predetermined light quantity cannot be obtained), the cylindrical lens 12 may be automatically arranged on the optical path, whereby the image may be switched to the line-like image L.

The beam splitter 3 is arranged on an upper side of the half mirror 2 in the Z-direction. The beam splitter 3 splits the object light coming from the surface of the work W into two, which object light transmits through the optical unit 10 and the half mirror 2 from below, and then makes such two pieces of light incident onto the detection units 4A and 4B.

The detection units 4A and 4B include: photo acceptance units 41A and 41B; and pinholes 42A and 42B provided in the respective photo acceptance units 41A and 41B. Each of the detection units 4A and 4B receives one of the two pieces of light split by the beam splitter 3, detects a quantity of the received light, and outputs the detected light quantity to the control unit 8.

The arithmetic operation unit 5 amplifies the respective output signals, which come from the detection units 4A and 4B, by an amplifier (not shown), and takes a difference between these amplified signals by an arithmetic operation circuit (not shown), thereby obtaining a focus error signal.

The stage 6 is arranged below the objective lens 13 in the Z-direction. The stage 6 mounts the work W on an upper surface thereof. The stage 6 is made movable in three directions, which are: horizontal directions (X-direction, Y-direction); and a vertical direction (Z-direction), by the stage drive mechanism unit 7.

The stage drive mechanism unit 7 supports the stage 6 so that the stage 6 can be movable in the X-, Y- and Z-directions.

Specifically, the stage drive mechanism unit 7 moves the stage 6 in the X-, Y- and Z-directions in response to a control signal outputted from the control unit 8 based on the focus error signal received by the arithmetic operation unit 5, and outputs position information (position coordinates) of the stage 6 in the X-, Y- and Z-directions to the control unit 8. Hence, a relative distance between the stage 6 and the objective lens 13 is changed by the stage drive mechanism unit 7, and adjusted to a focal length (detect a focus) on the surface of the work W.

The control unit 8 includes a central processing unit (CPU) 81, a random access memory (RAM) 82, a storage unit 83 and the like, and is connected to the light emitting unit 1, the detection units 4A and 4B, the arithmetic operation unit 5, the stage drive mechanism unit 7, the drive motor 124, and the like.

The CPU 81 reads out a variety of processing programs and the like, which are stored in the storage unit 83, then expands the programs and the like in the RAM 82, and executes various pieces of processing in cooperation with the expanded programs and the like, thereby controlling the whole of the autofocus device 100.

The RAM 82 expands the processing programs and the like, which are executed by the CPU 81, in a program storage region in the RAM 82, and in addition, stores input data, processing results and the like, which are generated at the time when the processing programs and the like are executed, in a data storage region in the RAM 82.

For example, the storage unit 83 is composed of a nonvolatile semiconductor memory, and stores: a system program executable by the CPU 81; the various processing programs executable by the system program concerned; data for use at the time of executing these various processing programs; data of various processing results obtained by arithmetic operation processing by the CPU 81; and the like. Note that, in the storage unit 83, the programs are stored in a form of program codes readable by a computer.

Moreover, the control unit 8 judges whether or not the quantities of the light, which are detected by the detection units 4A and 4B, exceed a predetermined threshold quantity. Here, it is recommended that the predetermined threshold quantity may be set at a quantity of a usually accepted light quantity. Then, when the control unit 8 judges that the light quantities do not exceed the predetermined threshold quantity, the control unit 8 judges that the usually accepted light quantity is not received, and makes an error judgment. That is to say, the control unit 8 functions as an error judging unit that judges whether or not the quantities of the object light, which are detected by the detection units 4A and 4B, exceed the predetermined threshold quantity, and makes an error judgment when the control unit 8 judges that the light quantities concerned do not exceed the predetermined threshold quantity.

Figure 4A:
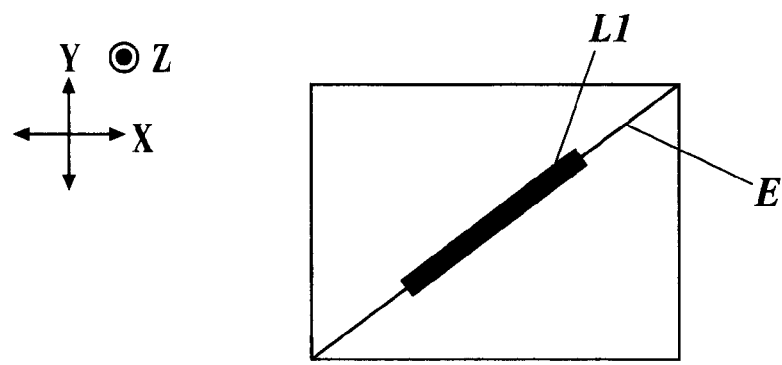
FIG. 4A is a plan view of the work W, showing a state where it is difficult to perform measurement since a line-like image L1 completely overlaps an edge line E.
Figure 4B:
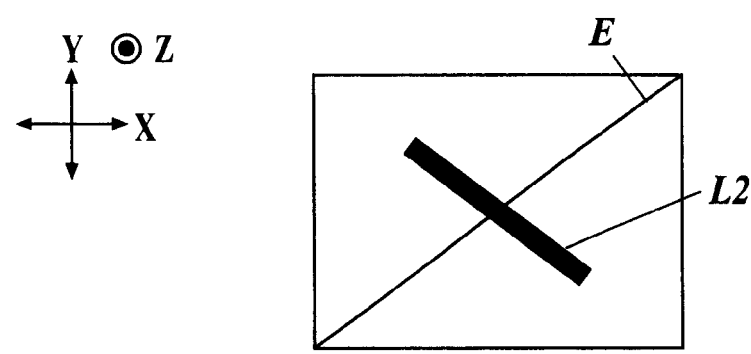
FIG. 4B is a plan view of the work W, showing a state where it is possible to perform the measurement since the complete overlap between a rotated line-like image L2 and the edge line E is resolved.

As a case where the control unit 8 makes the error judgment, for example, such a case as shown in FIG. 4A is mentioned, where the line-like image L formed on the surface of the work W completely overlaps the edge line E and the light forming the line-like image L is not reflected appropriately. In this case, the control unit 8 controls the rotation unit (drive motor 124) to rotate the cylindrical lens 12, and as shown in FIG. 4B, rotates the line-like image L, and resolves such complete overlap between the line-like L and the edge line E. That is to say, in the case of having detected an error by the control unit 8, the autofocus device 100 rotates the line-like image L, and can thereby resolve the error automatically.

Note that no particular limitations are imposed on an angle at which the line-like image L rotates at the time of the error judgment. For example, it is recommended that the line-like image L rotates by the angle which is multiples of 45° (45°, 90°, and 135°).

Figure 5A:
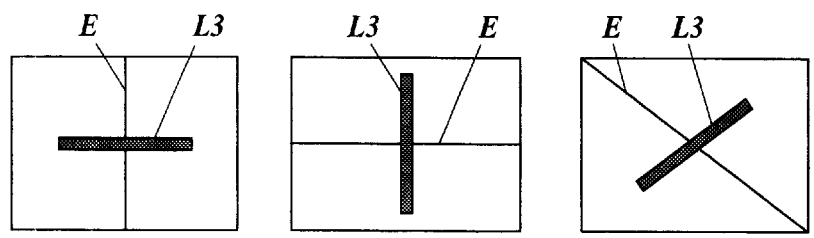
FIG. 5A is plan views of the work W, showing a line-like image L3 and the edge line E on a surface of a measurement target, the line-like image L3 being formed by light with a predetermined wavelength.
Figure 5B:
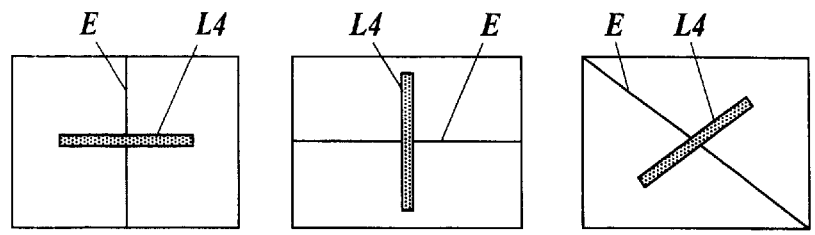
FIG. 5B is plan views of the work W, showing a line-like image L4 formed by light with a different wavelength from that in FIG. 5A and the edge line E.

Moreover, since the realization of the present invention does not depend on a wavelength of the light (electromagnetic wave) emitted from the light emitting unit 1, an optical source of the light emitting unit 1 can be changed as appropriate, and the wavelength of the light emitted from the light emitting unit 1 can be changed. Then, the wavelength of the light emitted from the light emitting unit 1 is changed, whereby, as shown in FIG. 5A and FIG. 5B, colors of line-like images L3 and L4 which appear on the surface of the work W are changed. That is to say, the color of the line-like image L can be changed in response to characteristics (color and reflectivity) of the work W.

Next, the functions of the autofocus device 100 are described.

In the autofocus device 100, the emitted light coming from the light emitting unit 1 is reflected by the half mirror 2 to the optical unit 10, transmits through the optical unit 10 from above, and is irradiated onto the work W. Then, the object light reflected on the surface of the work W transmits through the optical unit 10 and the half mirror 2 from below, is split into two and made incident onto the detection units 4A and 4B by the beam splitter 3.

The optical unit 10 includes the cylindrical lens 12 between the tube lens 11 and the objective lens 13, and the line-like image L is formed on the surface of the work W. Then, the object light reflected on the surface of the work W transmits again through the cylindrical lens 12 in the optical unit 10 from below, and accordingly, is returned to the circular shape.

That is to say, the circular emitted light emitted from the light emitting unit 1 is formed into the line shape by the cylindrical lens 12, and is reflected on the surface of the work W, and the line-like object light is returned to the circular shape by the cylindrical lens 12, and reaches the detection units 4A and 4B.

Here, the line-like image L formed on the surface of the work W is rotatable by rotating of the cylindrical lens 12. Therefore, whichever orientation the edge line E may be present in, the complete overlap between the line-like image L and the edge line E of the level difference can be avoided by rotating of the line-like image L, and it becomes possible to perform the focus detection.

Moreover, the control unit 8 judges whether or not the quantities of the object light, which are detected by the detection units 4A and 4B, exceed the predetermined threshold quantity. When the control unit 8 judges that the light quantities do not exceed the predetermined threshold quantity, the control unit 8 makes the error judgment. Then, when the error judgment is made, the control unit 8 controls the rotation unit (drive motor 124) to rotate the cylindrical lens 12, thereby rotates the line-like image L, and automatically resolves the error.

Furthermore, since the cylindrical lens 12 is provided detachably, the image can be switched between the line-like image L and the spot-like image by attaching and detaching of the cylindrical lens 12.

As described above, the autofocus device 100 according to the first embodiment includes: the light emitting unit 1; the optical unit 10, which is arranged between the light emitting unit 1 and the work W, and transmits therethrough the emitted light coming from the light emitting unit 1 and the object light coming from the work W so that the emitted light and the object light can pass through the same optical path; and the detection units 4A and 4B which perform the focus detection by the object light that has passed through the optical unit 10. The optical unit 10 includes: the tube lens 11 that converts the emitted light, which comes from the light emitting unit 1, into the parallel light; the cylindrical lens 12 that deforms the parallel light, which comes from the tube lens 12, into the line shape; the objective lens 13 that forms the line-like image L on the surface of the work W by the line-like light coming from the cylindrical lens 12; and the rotation unit (the first gear 121, the second gear 122, the rotation shaft 123, and the drive motor 124) that rotates the line-like image L by the predetermined angle.

Therefore, the line-like image L is formed on the surface of the work W, and the focus detection can be performed by the averaging effect even in the case where the level difference is present on the surface of the work W. Moreover, whichever orientation the level difference may be present in, the line-like image L rotates by rotating of the cylindrical lens 12, and the focus detection can be performed.

Moreover, in the autofocus device 100 according to the first embodiment, the cylindrical lens 12 is provided detachably.

Therefore, the image that appears on the surface of the work W can be switched between the line-like image L and the conventional spot-like image by detaching and attaching of the cylindrical lens 12. For example, it becomes possible to make such switching so that the spot-like image can be formed in a narrow range, and versatility of the device can be enhanced.

Moreover, the autofocus device 100 according to the first embodiment further includes: the error judging unit (control unit 8) that judges whether or not the quantities of the object light, which are detected by the detection units 4A and 4B, exceed the predetermined threshold quantity, and makes the error judgment when the control unit 8 judges that the light quantities concerned do not exceed the predetermined threshold quantity. The rotation unit (the first gear 121, the second gear 122, the rotation shaft 123, and the drive motor 124) rotates the line-like image L in the case where the error is detected by the control unit 8.

Therefore, for example, in such a case where the line-like image L completely overlaps the edge line E and is not appropriately reflected, the line-like image L rotates, the complete overlap between the line-like image L and the edge line E is resolved, and the error can be resolved automatically.

Moreover, the autofocus device 100 according to the first embodiment is capable of changing the color of the line-like image L by changing the wavelength of the emitted light coming from the light emitting unit 1.

Therefore, the color of the line-like image L can be changed as to the characteristics (color and reflectivity) of the work W, and the versatility can be enhanced.

Second Embodiment

A description is made of a configuration of an autofocus device 200 according to a second embodiment. Note that the same reference numerals are assigned to similar constituents to those of the first embodiment.

Figure 6A:
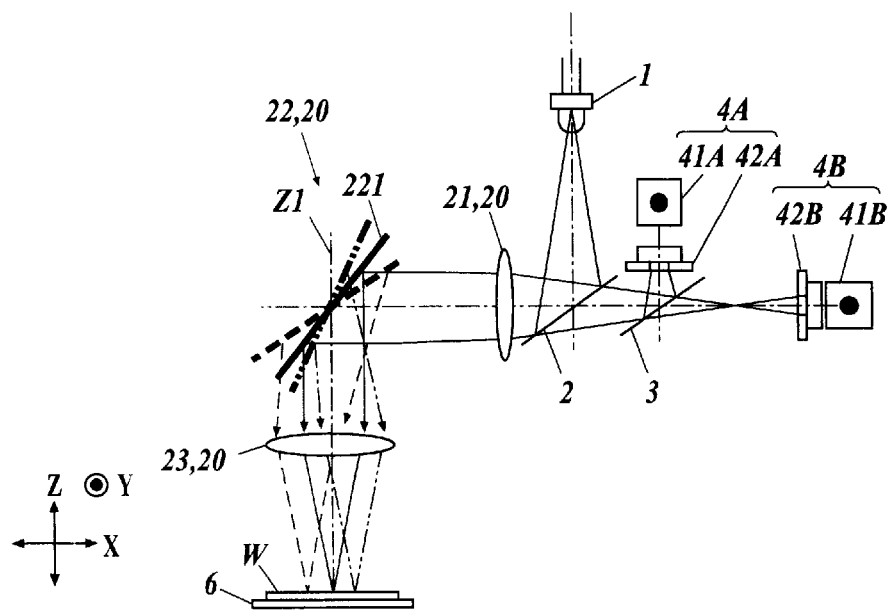
FIG. 6A is an elevation view showing an autofocus device 200 according to a second embodiment.
Figure 6B:
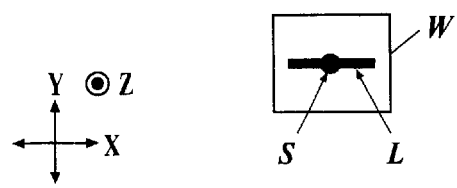
FIG. 6B is a plan view of a work W of FIG. 6A.
Figure 7:
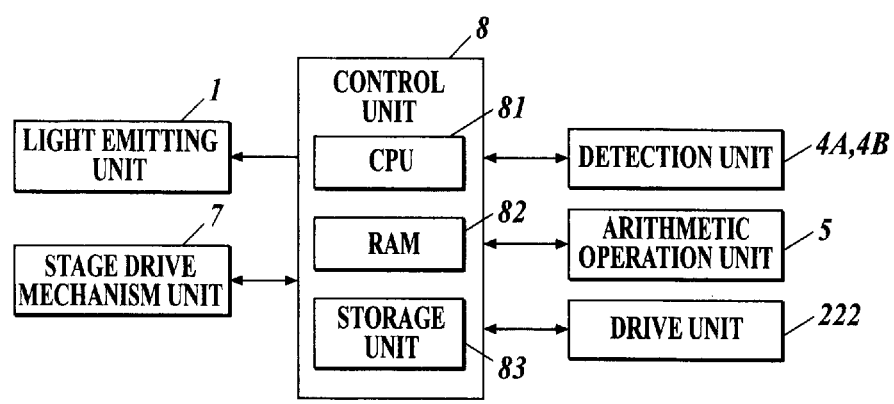
FIG. 7 is a block diagram showing the autofocus device 200 according to the second embodiment.
Figure 8A:
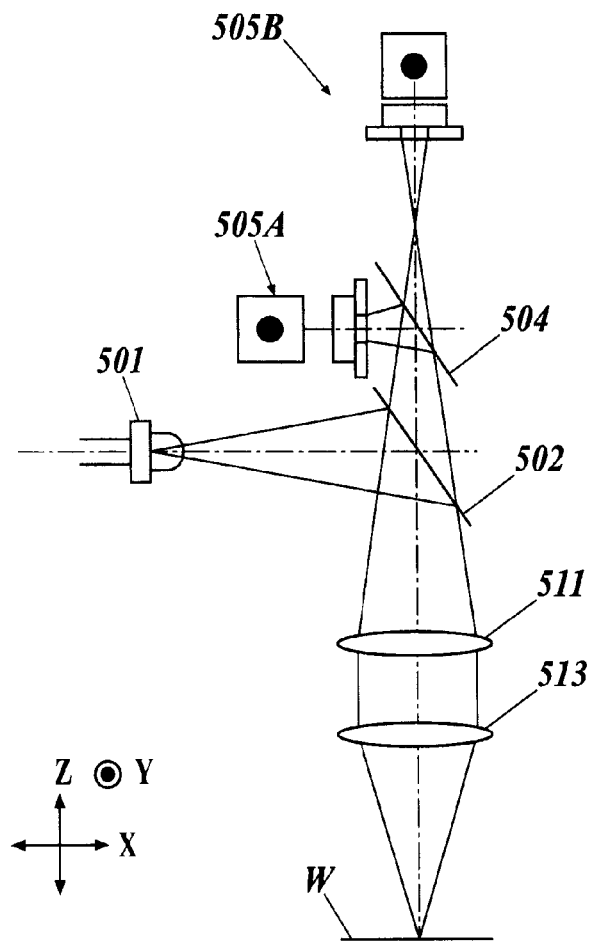
FIG. 8A is an elevation view showing a conventional autofocus device 500.
Figure 8B:
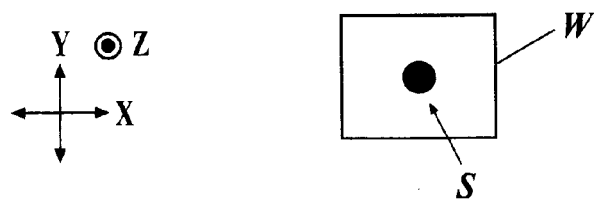
FIG. 8B is a plan view of a work W of FIG. 8A.
Figure 9A:
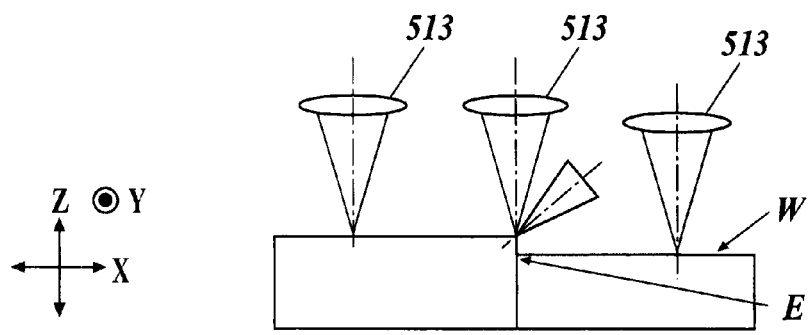
FIG. 9A is an elevation view showing a state where a single light beam irradiated onto a level difference of the work W is scattered by the edge line E in the conventional autofocus device 500.
Figure 9B:
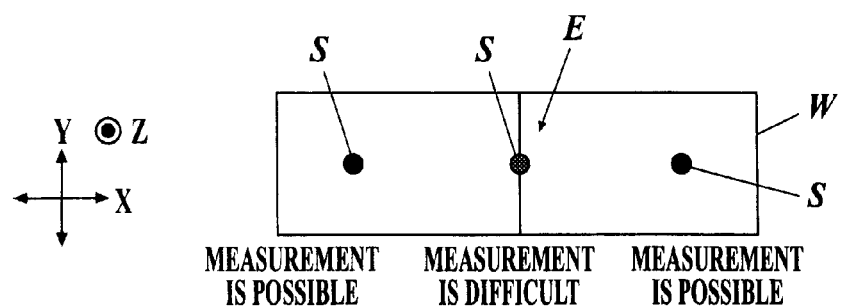
FIG. 9B is a plan view of the work W of FIG. 9A.
Figure 10A:
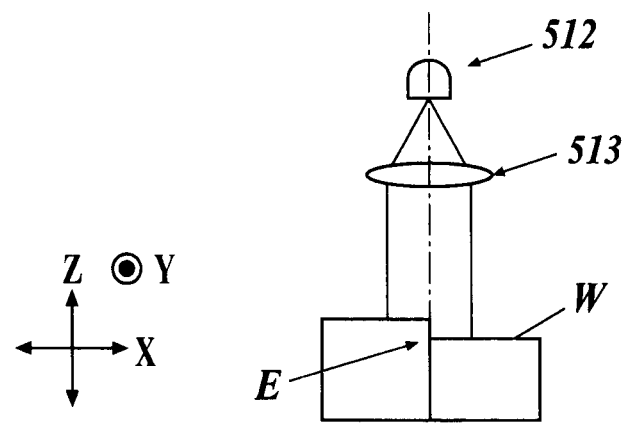
FIG. 10A is an elevation view showing the conventional autofocus device 500 in a state where it is possible to perform the measurement on the level difference of the work W.
Figure 10B:
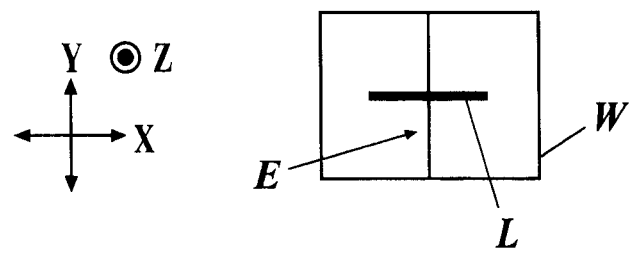
FIG. 10B is a plan view of the work W of FIG. 10A.
Figure 10C:
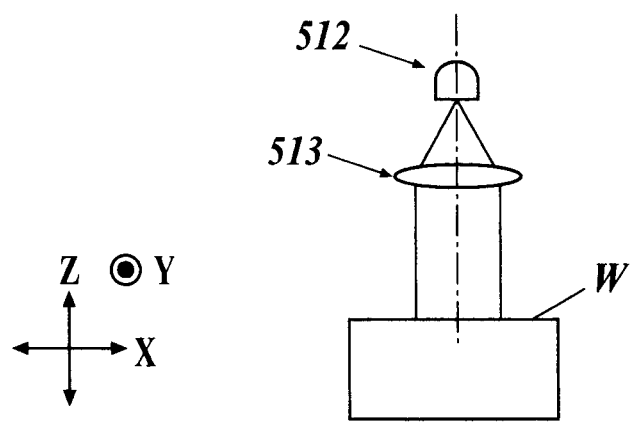
FIG. 10C is an elevation view showing the conventional autofocus device 500 in a state where it is difficult to perform the measurement on the level difference since the work W of FIG. 10A rotates by 90°.
Figure 10D:
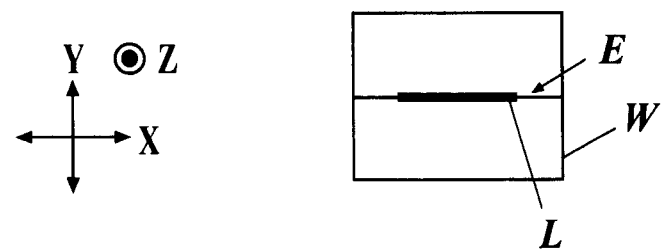
FIG. 10D is a plan view of the work W of FIG. 10C.

As shown in FIGS. 6A, 6B, and FIG. 7, the autofocus device 200 according to the second embodiment includes: a light emitting unit 1; a half mirror 2; an optical unit 20; a beam splitter 3; detection units 4A and 4B; an arithmetic operation unit 5; a stage 6; a stage drive mechanism unit 7; a control unit 8; and the like.

In the second embodiment, as shown in FIG. 6A, a direction from the light emitting unit 1 to the half mirror 2 is defined as a Z-direction (vertical direction), a direction from the half mirror 2 to the optical unit 20 is defined as an X-direction (right and left direction), and a direction perpendicular to the X-direction and the Z-direction is defined as a Y-direction (front and back direction).

For example, the light emitting unit 1 includes an optical source such as a discharge lamp, a light emitting diode and LASER, and generates and emits a light beam. The light (emitted light) emitted from the light emitting unit 1 is irradiated onto the half mirror 2 arranged on a lower side of the light emitting unit 1 in the Z-direction.

The half mirror 2 reflects the emitted light, which comes from the light emitting unit 1, toward the optical unit 20 arranged on a left side of the light emitting unit 1 in the X-direction. The emitted light reflected by the half mirror 2 is irradiated onto the optical unit 20 from rightward.

Moreover, the half mirror 2 transmits therethrough object light, which is the emitted light reflected on a surface of a work W, travels through the optical unit 20 in a reverse direction to a traveling direction of the emitted light. The object light transmitted through the half mirror 2 goes toward the beam splitter 3.

The optical unit 20 is arranged between the half mirror 2 and the work W, and allows the emitted light coming from the light emitting unit 1 and the object light coming from the work W to pass through the same optical path.

Specifically, the optical unit 20 is composed by including a tube lens 21 and a line-like image forming unit 22.

The tube lens 21 forms the emitted light, which is incident thereonto from the half mirror 2, into parallel light, and irradiates the parallel light onto the line-like image forming unit 22 arranged on a left side of the tube lens 21 in the X-direction.

As a light shape deforming unit, the line-like image forming unit 22 deforms such circular parallel light, which comes from the tube lens 21, into a line shape.

Specifically, the line-like image forming unit 22 includes: a drive mirror 221; a drive unit 222 that drives the drive mirror 221; and an objecting lens 23.

The drive mirror 221 is arranged so that a reflection plane thereof can be inclined with respect to the parallel light coming from the tube lens 21. For example, the drive mirror 221 is composed of an electromagnetic-driven micro electro mechanical systems (MEMS) mirror, which uses a MEMS technology. The drive mirror 221 rotates the reflection plane thereof reciprocatingly around an arbitrary rotation axis perpendicular to a direction of an optical axis (Z1 in FIG. 6A) in the Z-direction, the optical axis Z1 connecting the drive mirror 221 and the surface of the work W to each other. The reflection plane of the drive mirror 221 reflects the parallel light, which comes from the tube lens 21, toward the objective lens 23.

Specifically, in the case where the circular parallel light coming from the tube lens 21 is irradiated onto the drive mirror 221 from a direction inclined with respect to the reflection plane of the drive mirror 221, and the reflection plane of the drive mirror 221 rotates reciprocatingly at the time when the circular parallel light is reflected by the reflection plane of the drive mirror 221, then the circular parallel light is converted into a line-like beam, and the line-like beam is irradiated onto the objective lens 23 located below.

That is to say, when the reflection plane of the drive mirror 221 rotates, a reflection angle of the parallel light is changed. Therefore, when the reflection plane rotates reciprocatingly, a spot-like image condensed by the objective lens 23 continuously moves in a line fashion on the surface of the work W in response to the reflection angle concerned. In such a way, a line-like image L is formed as shown in FIG. 6B.

Note that, in FIG. 6B, the line-like image L is formed in the X-direction (right and left direction); however, as shown in FIG. 3A to FIG. 3C, the autofocus device 200 according to the second embodiment can rotate the line-like image L by predetermined angles. Specifically, the drive unit 222 is controlled, whereby such a reciprocal rotation axis direction of the reflection plane of the drive mirror 221 rotates by a predetermined angle around the optical axis Z1 connecting the drive mirror 221 and the work W to each other. In such a way, the line-like image L formed on the surface of the work W can rotate by the predetermined angles.

In response to a control signal outputted by the control unit 8, the drive unit 222 rotates the reflection plane of the drive mirror 221 reciprocatingly around an arbitrary axis perpendicular to the direction of the optical axis Z1 connecting the drive mirror 221 and the surface of the work W to each other. Moreover, the drive unit 222 also functions as a rotation unit that rotates the reciprocal rotation axis direction of the reflection plane around the optical axis Z1 connecting the drive mirror 221 and the work W to each other, and thereby rotates the line-like image L.

Moreover, the drive unit 222 can be switched between a state where the reflection plane of the drive mirror 221 rotates reciprocatingly (drive state) and a state where the reciprocal rotation of the reflection plane of the drive mirror 221 is stopped still (static state). In the state where such reciprocal rotation of the reflection plane of the drive mirror 221 is stopped still, a spot-like image S is formed. The image formed on the surface of the work W can be switched between the line-like image L and the spot-like image S by switching the drive unit 222 between the drive state and the static state.

The objective lens 23 is provided to face to the work W. In the case where the reflection plane of the drive mirror 221 rotates reciprocatingly (drive state), the objective lens 23 forms the line-like image L on the surface of the work W by the parallel light irradiated thereonto from the reflection plane of the drive mirror 221. Meanwhile, in the case where the reflection plane of the drive mirror 221 is stopped still (static state), the objective lens 23 forms the spot-like image S on the surface of the work W by the parallel light irradiated thereonto from the drive mirror 221.

Hence, in the drive state, the light reflected by the half mirror 2 passes though the optical unit 20 (the tube lens 21, the line-like image forming unit 22), reaches the work W, and forms the line-like image L on the surface of the work W.

The reciprocal rotation axis direction of the reflection plane of the drive mirror 221 rotates around the optical axis Z1, whereby it is possible to rotate the line-like image L formed on the surface of the work W.

Hence, for example, as shown in FIG. 3A to FIG. 3C, the line-like image L rotates so as not to completely overlap the edge line E present on the surface of the work W, whereby the focus detection can be performed whichever orientation the edge line E may be present in.

Then, at the time of passing through the optical unit 20 in the reverse direction to the traveling direction of the emitting light, the object light, which is the emitted light reflected on the surface of the work W, travels through the same optical path as that of the emitted light in such a reverse direction thereto and is converted into circular parallel light by the line-like image forming unit 22. Then, the object light transmits through the half mirror 2, and goes toward the beam splitter 3.

The beam splitter 3 is arranged on a right side of the half mirror 2 in the X-direction, splits the object light coming from the surface of the work W, which passes through the optical unit 20 and the half mirror 2, into two, and then makes such two pieces of light incident onto the detection units 4A and 4B.

The detection units 4A and 4B are composed of: photo acceptance units 41A and 41B; and pinholes 42A and 42B provided in the respective photo acceptance units 41A and 41B. Each of the detection units 4A and 4B receives one of the two pieces of light split by the beam splitter 3, detects a quantity of the received light, and outputs the detected light quantity to the control unit 8.

The arithmetic operation unit 5 amplifies the respective output signals, which come from the detection units 4A and 4B, by an amplifier (not shown), and takes a difference between these amplified signals by an arithmetic operation circuit (not shown), thereby obtaining a focus error signal.

Below the objective lens 23 in the Z-direction, the stage 6 mounts the work W on an upper surface thereof. This stage 6 is made movable in three directions, which are: horizontal directions (X-direction, Y-direction); and a vertical direction (Z-direction), by the stage drive mechanism unit 7.

The stage drive mechanism unit 7 supports the stage 6 so that the stage 6 can be movable in the X-, Y- and Z-directions.

Specifically, the stage drive mechanism unit 7 moves the stage 6 in the X-, Y- and Z-directions in response to a control signal outputted from the control unit 8 based on the focus error signal received by the arithmetic operation unit 5, and in addition, outputs position information (position coordinates) of the stage 6 in the X-, Y- and Z-directions to the control unit 8. Hence, a relative distance between the stage 6 and the objective lens 23 is changed by the stage drive mechanism unit 7, and adjusted to a focal length (detect a focus) on the surface of the work W.

The control unit 8 includes a central processing unit (CPU) 81, a random access memory (RAM) 82, a storage unit 83 and the like, and is connected to the light emitting unit 1, the detection units 4A and 4B, the arithmetic operation unit 5, the stage drive mechanism unit 7, the drive unit 222, and the like.

The CPU 81 reads out a variety of processing programs and the like, which are stored in the storage unit 83, then expands the programs and the like in the RAM 82, and executes various pieces of processing in cooperation with the expanded programs and the like, thereby controlling the whole of the autofocus device 200.

The RAM 82 expands the processing programs and the like, which are executed by the CPU 81, in a program storage region in the RAM 82, and in addition, stores input data, processing results and the like, which are generated at the time when the processing programs and the like are executed, in a data storage region in the RAM 82.

For example, the storage unit 83 is composed of a nonvolatile semiconductor memory, and stores: a system program executable by the CPU 81; the various processing programs executable by the system program concerned; data for use at the time of executing these various processing programs; data of various processing results obtained by arithmetic operation processing by the CPU 81; and the like. Note that, in the storage unit 83, the programs are stored in a form of program codes readable by a computer.

Moreover, in a similar way to the first embodiment, the control unit 8 functions as an error judging unit that judges whether or not the quantities of the object light, which are detected by the detection units 4A and 4B, exceed the predetermined threshold quantity, and makes an error judgment when the control unit 8 judges that the light quantities do not exceed the predetermined threshold quantity. When the error judgment is made, the control unit 8 rotates the reciprocal rotation axis direction of the reflection plane of the drive mirror 221 around the optical axis Z1, thereby rotates the line-like image L formed on the surface of the work W, and automatically resolves the complete overlap between the line-like image L and the edge line E.

Note that no particular limitations are imposed on an angle at which the line-like image L rotates at the time of the error judgment. For example, it is recommended that the line-like image L rotates by 45° around the optical axis Z1.

Moreover, in a similar way to the first embodiment, also in the autofocus device 200 according to the second embodiment, an optical source of the light emitting unit 1 is changed as appropriate, and a wavelength of the light emitted from the light emitting unit 1 is changed, whereby color of the line-like image L can be changed.

Next, the functions of the autofocus device 200 are described.

In the autofocus device 200, the light emitted from the light emitting unit 1 is reflected by the half mirror 2 onto the optical unit 20, passes through the optical unit 20, and is irradiated onto the work W. The object light reflected on the surface of the work W transmits through the optical unit 20 and the half mirror 2 in the reverse direction to that of the emitted light, is split into two and made incident onto the detection units 4A and 4B through the beam splitter 3.

The optical unit 20 includes the line-like image forming unit 22 between the tube lens 21 and the objective lens 23, and in the case (drive state) where the reflection plane of the drive mirror 221 rotates reciprocatingly, the line-like image L is formed on the surface of the work W. The object light reflected on the surface of the work W passes again through the line-like image forming unit 22 in the optical unit 20, is returned to the circular shape, and reaches the detection units 4A and 4B.

The reciprocal rotation axis direction of the reflection plane of the drive mirror 221 rotates around the optical axis Z1, whereby it is possible to rotate the line-like image L, which is formed on the surface of the work W, around the optical axis Z1. Therefore, the line-like image L rotates, whereby the complete overlap between the line-like image L1 and the edge line E of the level difference can be avoided, and it is possible to perform the focus detection whichever orientation the edge line E may be present in.

Moreover, the control unit 8 judges whether or not the quantities of the object light, which are detected by the detection units 4A and 4B, exceed the predetermined threshold quantity. When the control unit 8 judges that the light quantities do not exceed the predetermined threshold quantity, the control unit 8 makes the error judgment. When the error judgment is made, the control unit 8 rotates the drive mirror 221 around the optical axis Z1, thereby rotates the line-like image L, and automatically resolves the error.

Furthermore, the drive mirror 221 can be switched between the drive state and the static state, and the drive mirror 221 can be stopped still, whereby the line-like image L can be switched to the spot-like image.

As described above, the autofocus device 200 according to the second embodiment includes: the light emitting unit 1; the optical unit 20, which is arranged between the light emitting unit 1 and the work W, and passes therethrough the emitted light coming from the light emitting unit 1 and the object light coming from the work W so that the emitted light and the object light can pass through the same optical path; and the detection units 4A and 4B which perform the focus detection by the object light that has passed through the optical unit 20. The optical unit 20 includes: the tube lens 21 that converts the emitted light, which comes from the light emitting unit 1, into the parallel light; the line-like image forming unit 22 (the drive mirror 221, the drive unit 222, and the objective lens 23) that forms the line-like image L on the surface of the work W; and the rotation unit (the drive motor 222) that rotates the line-like image L by the predetermined angle.

Therefore, the line-like image L is formed on the surface of the work W, and the focus detection can be performed by the averaging effect even in the case where the level difference is present on the surface of the work W. Moreover, the drive mirror 221 rotates around the optical axis Z1, whereby it is possible to rotate the line-like image L. Therefore, whichever orientation the level difference may be present in, the focus detection can be performed.

Moreover, the drive unit 222 of the autofocus device 200 according to the second embodiment is capable of switching the drive mirror 221 between the drive state and the static state, and the drive mirror 221 is switched between the drive state and the static state, whereby the image can be switched between the line-like image L and the spot-like image S.

Therefore, for example, it becomes possible to make such switching so that the spot-like image S can be formed in a narrow range, and versatility of the device can be enhanced.

Moreover, the autofocus device 200 according to the second embodiment further includes: the error judging unit (control unit 8) that judges whether or not the quantities of the object light, which are detected by the detection units 4A and 4B, exceed the predetermined threshold quantity, and makes the error judgment when the control unit 8 judges that the light quantities concerned do not exceed the predetermined threshold quantity. The drive unit 222 (the rotation unit) rotates the line-like image L in the case where the error is detected by the control unit 8.

Therefore, for example, in such a case where the line-like image L completely overlaps the edge line E and is not appropriately reflected, the line-like image L rotates, the overlap between the line-like image L and the edge line E can be resolved, and the error can be resolved automatically.

Moreover, the autofocus device 200 according to the second embodiment is capable of changing the color of the line-like image L by changing the wavelength of the emitted light coming from the light emitting unit 1.

Therefore, the color of the line-like image L can be changed in response to the characteristics (color and reflectivity) of the work W, and the versatility can be enhanced.

The description is specifically made above of the present invention based on the embodiments related thereto. However, the present invention is not limited to the above-described embodiments, and is alterable within the scope without departing from the spirit thereof.

For example, in each of the autofocus devices according to the above-described embodiments, the configuration using the pinhole method has been illustrated; however, detection principles other than the pinhole method, such as a knife edge method, a Foucault method, and an astigmatic method, may be used.

Moreover, in the above-described embodiment, the drive unit 222 also functions as the rotation unit that rotates the line-like image L by rotating the reciprocal rotation axis direction of the reflection plane of the drive mirror 221 around the optical axis Z1; however, the present invention is not limited to this. For example, separately from the drive unit 222, a mechanism may be provided, which rotates the reciprocal rotation axis direction of the reflection plane of the drive mirror 221 around the optical axis Z1.

Although various exemplary embodiments have been shown and described, the invention is not limited to the embodiments shown. Therefore, the scope of the invention is intended to be limited solely by the scope of the claims that follow.

What is claimed is:

1. An autofocus device comprising:
    an optical source;
    an optical unit that allows emitted light from the optical source and object light from a measurement target to pass through the same optical path, the optical unit being arranged between the optical source and the measurement target; and
    a detection unit that performs focus detection by using the object light passed through the optical unit,
    wherein the optical unit comprises:
    a tube lens that forms the emitted light into parallel light;
    an image forming unit that forms a continuous line image on a surface of the measurement target by the parallel light from the tube lens; and
    a rotation unit that rotates the continuous line image around an axis of the optical path between the optical unit and the measurement target.

2. The autofocus device according to claim 1,
    wherein the image forming unit comprises a cylindrical lens, and
    the rotation unit rotates the continuous line image by rotating the cylindrical lens.

3. The autofocus device according to claim 2, wherein the cylindrical lens is provided detachably.

4. The autofocus device according to claim 2, wherein the rotation unit rotates the cylindrical lens such that the continuous line image does not overlap with an edge line of the measurement target.

5. The autofocus device according to claim 1,
    wherein the image forming unit includes:
    a drive mirror that reflects the parallel light from the tube lens;
    an objective lens that forms a spot image on the surface of the measurement target by the parallel light reflected on a reflection plane of the drive mirror; and
    a drive unit that rotates the reflection plane of the drive mirror around a rotation axis perpendicular to an optical axis direction connecting the drive mirror and the surface of the measurement target to each other, wherein
    the drive unit moves the spot image into a line shape to form the continuous line image by rotating the drive mirror, and
    the rotation unit rotates the continuous line image by rotating the reflection plane of the drive mirror around the optical axis connecting the drive mirror and the surface of the measurement target to each other.

6. The autofocus device according to claim 5, wherein the drive unit further switches a state of the drive mirror between a rotated state and a stop state, and in the rotated state of the drive mirror a shape of an image formed on the surface of the measurement target is the continuous line and in the stop state of the drive mirror a shape of an image formed on the surface of the measurement target is a spot.

7. The autofocus device according to claim 5, wherein the rotation unit rotates the reflection plane of the drive mirror such that the continuous line image does not overlap an edge line of the measurement target.

8. The autofocus device according to claim 1, further comprising:
    an error judging unit that judges whether or not a light quantity of the object light detected by the detection unit exceeds a predetermined threshold quantity, and makes an error judgment when the light quantity does not exceed the predetermined threshold quantity, and wherein
    the rotation unit rotates the continuous line image when the error judgment is made by the error judging unit.

9. The autofocus device according to claim 1, wherein a color of the continuous line image is changed by changing a wavelength of the emitted light from the optical source.

10. The autofocus device according to claim 1, wherein the rotation unit rotates the continuous line image such that the continuous line image does not overlap with an edge line of the measurement target.

* * * * *